US012436659B2

(12) United States Patent
Anvaripour et al.

(10) Patent No.: US 12,436,659 B2
(45) Date of Patent: Oct. 7, 2025

(54) DYNAMIC MEDIA SELECTION MENU

(71) Applicant: Snap Inc., Santa Monica, CA (US)

(72) Inventors: Kaveh Anvaripour, Santa Monica, CA (US); Ebony James Charlton, Los Angeles, CA (US); Travis Chen, Los Angeles, CA (US); Gabriel Lupin, Marina del Rey, CA (US); Celia Nicole Mourkogiannis, Los Angeles, CA (US); Kevin Dechau Tang, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 16/819,659

(22) Filed: Mar. 16, 2020

(65) Prior Publication Data
US 2020/0310601 A1 Oct. 1, 2020

Related U.S. Application Data

(60) Provisional application No. 62/826,640, filed on Mar. 29, 2019.

(51) Int. Cl.
G06F 3/0482 (2013.01)
G06F 3/0481 (2022.01)
G06F 3/04812 (2022.01)
G06F 3/04817 (2022.01)
G06F 3/0485 (2022.01)
G06F 3/04855 (2022.01)
G06F 3/0488 (2022.01)
G06F 3/04883 (2022.01)
H04M 1/72427 (2021.01)
(Continued)

(52) U.S. Cl.
CPC ........ G06F 3/0482 (2013.01); G06F 3/04812 (2013.01); G06F 3/04817 (2013.01); G06F 3/04855 (2013.01); G06F 3/04883 (2013.01); H04M 1/72427 (2021.01); H04M 1/72472 (2021.01); H04N 23/631 (2023.01)

(58) Field of Classification Search
CPC ............... G06F 3/0482; G06F 3/04812; G06F 3/04817; G06F 3/04855; G06F 3/04883; H04N 5/232933; H04M 1/72544; H04M 1/72586; H04M 1/72472; H04M 1/72427
USPC ........................................................ 715/781
See application file for complete search history.

(56) References Cited

U.S. PATENT DOCUMENTS 8,239,783 B2 * 8/2012 Fong ...................... H04N 23/62
345/646
2006/0070007 A1 * 3/2006 Cummins ........... G06F 16/2428
715/708
(Continued)

FOREIGN PATENT DOCUMENTS

CN 113892096 A 1/2022

OTHER PUBLICATIONS

"International Application Serial No. PCT/US2020/023348, International Search Report mailed Jun. 16, 2020", 4 pgs.
(Continued)

Primary Examiner — Stephen S Hong
Assistant Examiner — Darrin Hope
(74) Attorney, Agent, or Firm — Schwegman Lundberg & Woessner, P.A.

(57) ABSTRACT

A dynamic media menu that comprises a media carousel to present collections of media content, and an "Augmented-Reality (AR) bar" to receive inputs to identify a media category.

12 Claims, 9 Drawing Sheets

(51) Int. Cl.
*H04M 1/72472* (2021.01)
*H04M 1/725* (2021.01)
*H04N 5/232* (2006.01)
*H04N 23/63* (2023.01)

(56) References Cited

U.S. PATENT DOCUMENTS

| | | | |
|---|---|---|---|
| 2006/0161868 A1* | 7/2006 | Van Dok | G06F 3/0481 715/835 |
| 2010/0017710 A1* | 1/2010 | Kim | G06F 3/0488 715/702 |
| 2012/0299961 A1 | 11/2012 | Ramkumar et al. | |
| 2016/0360116 A1* | 12/2016 | Penha | G06F 3/04817 |
| 2017/0018018 A1* | 1/2017 | Akpala | G06F 3/0488 |
| 2017/0161382 A1* | 6/2017 | Ouimet | G11B 27/34 |
| 2018/0060354 A1* | 3/2018 | Ruben | G06F 16/5854 |
| 2018/0060659 A1 | 3/2018 | He et al. | |
| 2018/0109751 A1 | 4/2018 | Choi et al. | |
| 2018/0143748 A1 | 5/2018 | Ahmed et al. | |
| 2018/0191797 A1* | 7/2018 | Javier | G06F 40/174 |
| 2018/0191962 A1* | 7/2018 | Javier | H04N 5/23293 |
| 2019/0095436 A1 | 3/2019 | Martinazzi et al. | |

OTHER PUBLICATIONS

"International Application Serial No. PCT/US2020/023348, Written Opinion mailed Jun. 16, 2020", 6 pgs.

"International Application Serial No. PCT/US2020/023348, International Preliminary Report on Patentability mailed Oct. 14, 2021", 8 pgs.

"European Application Serial No. 20720560.0, Communication Pursuant to Article 94(3) EPC mailed Mar. 2, 2023", 6 pgs.

"European Application Serial No. 20720560.0, Communication Pursuant to Article 94(3) EPC mailed Dec. 11, 2023", 10 pgs.

"European Application Serial No. 20720560.0, Response filed Apr. 9, 2024 to Communication Pursuant to Article 94(3) EPC mailed Dec. 11, 2023", 12 pgs.

"Korean Application Serial No. 10-2021-7035169, Notice of Preliminary Rejection mailed Mar. 29, 2024", w/ English translation, 15 pgs.

"Korean Application Serial No. 10-2021-7035169, Response filed May 29, 2024 to Notice of Preliminary Rejection mailed Mar. 29, 2024", w/ current English claims, 25 pgs.

* cited by examiner

400

CAUSING DISPLAY OF A GUI AT A CLIENT DEVICE, THE GUI COMPRISING A DISPLAY OF LIVE CAMERA DATA FROM A CAMERA OF THE CLIENT DEVICE
402

RECEIVING AN INPUT VIA THE GUI AT THE CLIENT DEVICE
404

ACCESSING MEDIA CONTENT IN RESPONSE TO THE INPUT ONTO THE GUI AT THE CLIENT DEVICE, THE MEDIA CONTENT COMPRISING A PLURALITY OF MEDIA CATEGORIES THAT INCLUDE AT LEAST A FIRST MEDIA CATEGORY
406

SELECTING THE FIRST MEDIA CATEGORY BASED ON AT LEAST THE LIVE CAMERA DATA FROM THE CAMERA OF THE CLIENT DEVICE
408

FILTERING THE MEDIA CONTENT BASED ON THE FIRST MEDIA CATEGORY
410

CAUSING DISPLAY OF A PRESENTATION OF THE FILTERED MEDIA CONTENT WITHIN THE GUI AT THE CLIENT DEVICE, THE PRESENTATION OF THE FILTERED MEDIA CONTENT COMPRISING AN IDENTIFICATION OF THE FIRST MEDIA CATEGORY
412

FIG. 4

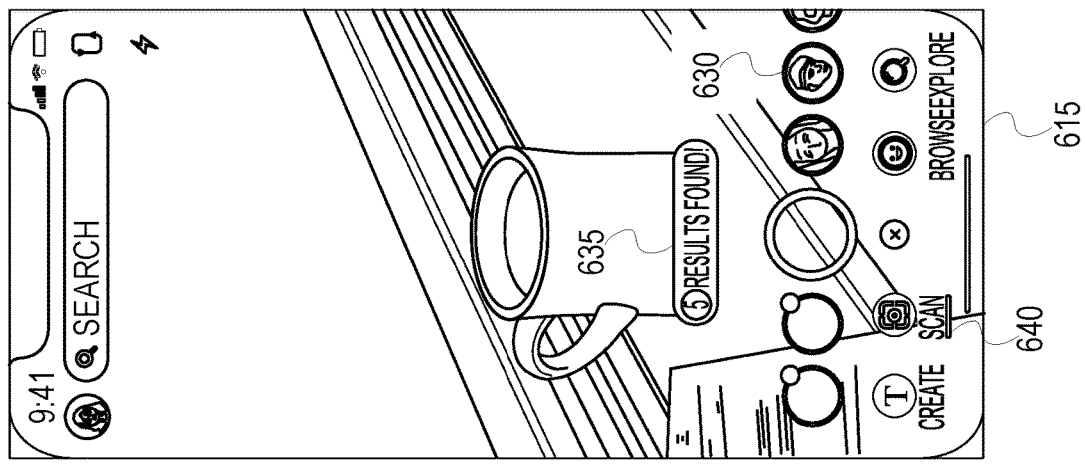
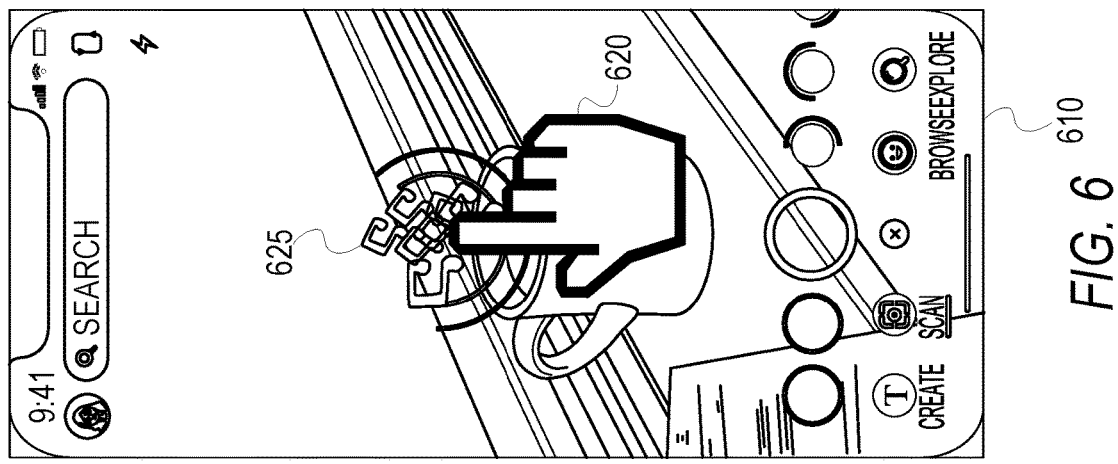
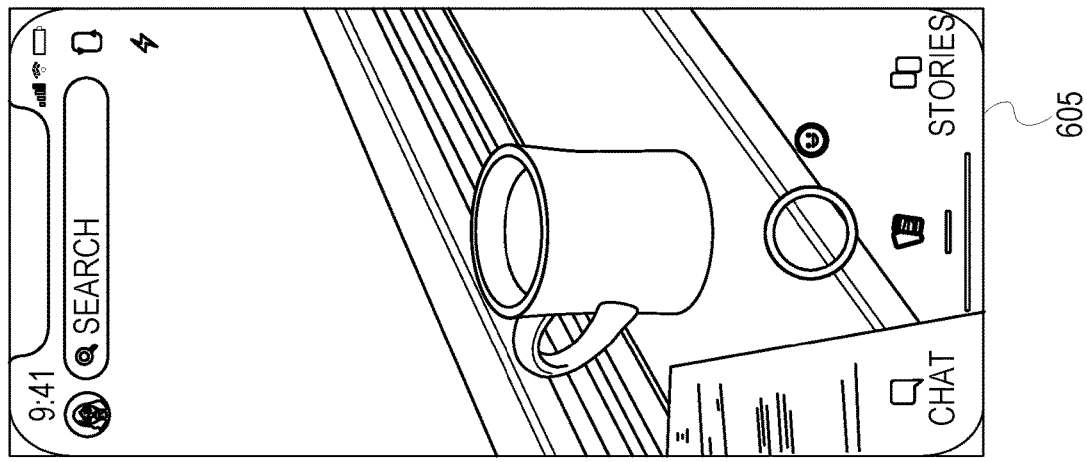
FIG. 6

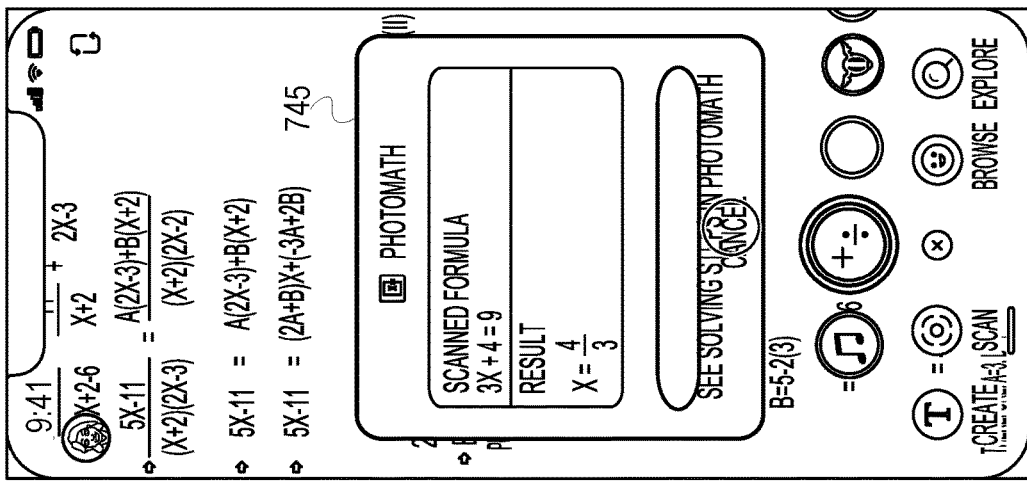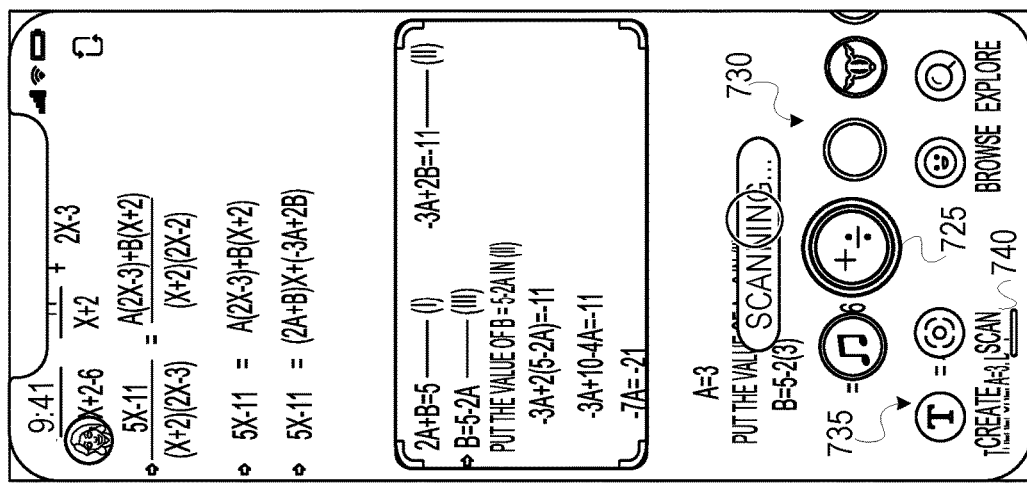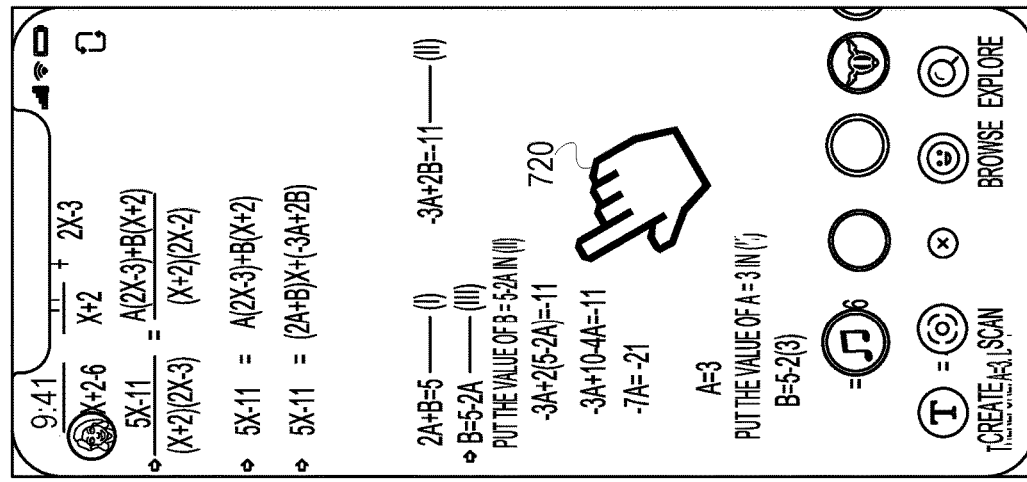
FIG. 7

DYNAMIC MEDIA SELECTION MENU

CLAIM OF PRIORITY

This application claims the benefit of priority to U.S. Provisional application Ser. No. 62/826,640, filed on Mar. 29, 2019, which is incorporated herein by reference in its entirety.

TECHNICAL FIELD

Embodiments of the present disclosure relate generally to mobile computing technology and, more particularly, but not by way of limitation, to systems for generating a dynamic menu element to present collection of media content.

BACKGROUND

Media sharing platforms continually expand and grow collections of media content to be made available to users. Certain media platforms provide users with simple interfaces to navigate through such collections of media content, however as these collections continue to grow and reach numbers in the hundreds of thousands, the efficiency to access relevant media content from the collection becomes increasingly difficult. For example, due to display limitations of mobile devices, only a small portion of available media content may be presented at a given time, and non-intuitive.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 4 is a flowchart depicting a method of generating and causing display of a dynamic menu element within a graphical user interface (GUI), according to certain example embodiments.

FIG. 6 is an interface flow-diagram depicting interfaces generated by a dynamic menu system, according to certain example embodiments.

FIG. 7 is an interface0flow-diagram depicting interfaces generated by a dynamic menu system, according to certain example embodiments.

DETAILED DESCRIPTION

Figure 1:
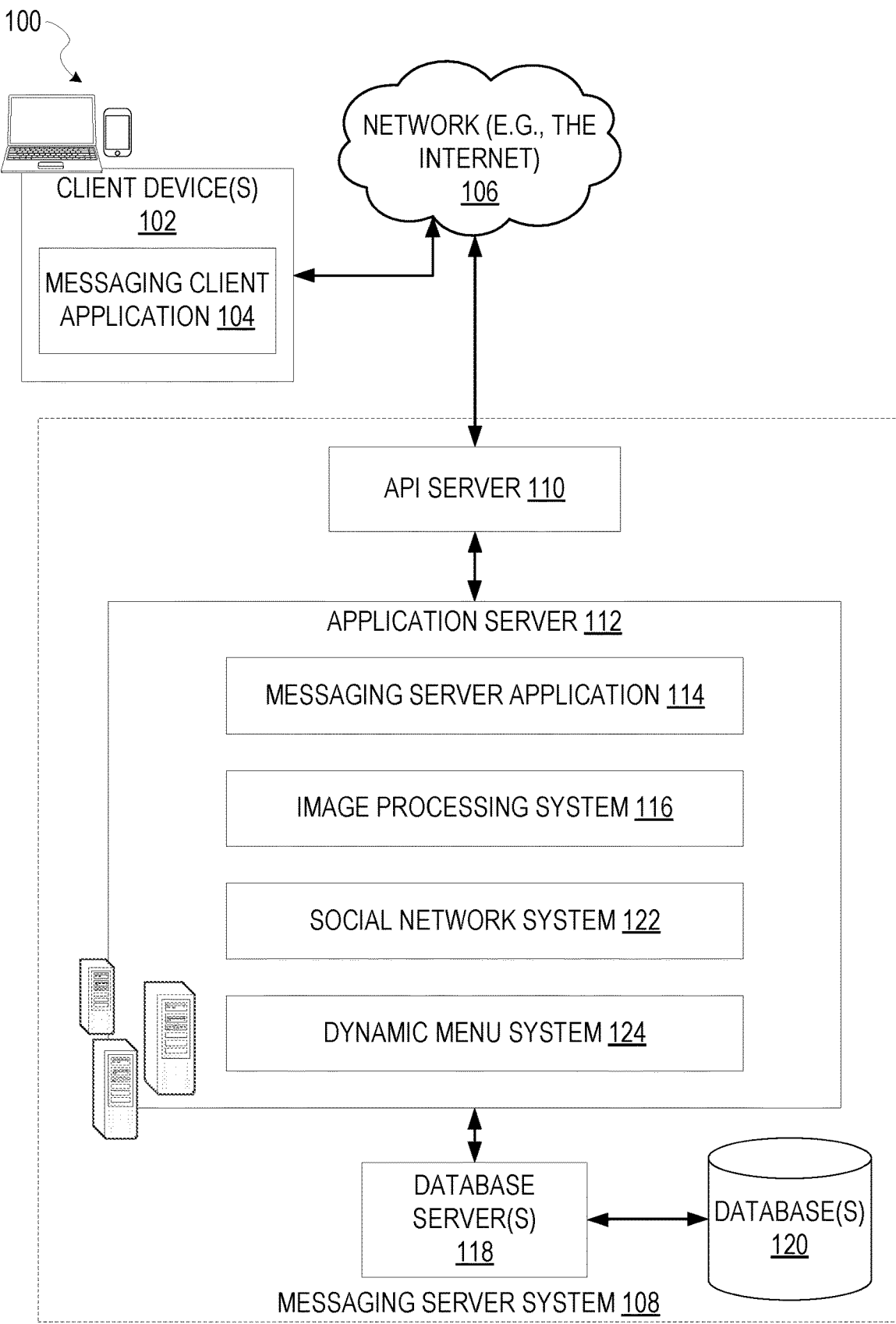
FIG. 1 is a block diagram showing an example messaging system for exchanging data (e.g., messages and associated content) over a network in accordance with some embodiments, wherein the messaging system includes a dynamic menu system.

As discussed above, media sharing platforms are continually expanding collections of media content available to users. While a growing inventory of available media content is beneficial to users, existing interfaces to navigate through the collection of media content are inefficient and non-intuitive, making the identification of relevant media content tedious. An improved GUI to provide a dynamic view of available media content would therefore be beneficial in such applications.

Example embodiments described herein relate to a dynamic menu system to generate a dynamic media menu that comprises at least a media carousel to present collections of media content, and an "Augmented-Reality (AR) bar" to receive inputs to identify a media category. According to certain embodiments, the dynamic menu system is configured to perform operations that include: causing display of a GUI at a client device, wherein the GUI comprises a display of live camera data from a camera of or associated with the client device; receiving an input onto the GUI at the client device, wherein the input may include a tactile input; accessing media content at a media repository in response to the input onto the GUI, the media content comprising a plurality of media categories based on properties of the media content; selecting a media category from among the plurality of media categories based on at least the live camera data from the camera of or associated with the client device; filtering the media content of the media repository based on the media category; and causing display of a presentation of the filtered media content within the GUI at the client device, wherein the presentation of the filtered media content comprises an identification of the media category that corresponds with the filtered media content at a first position within the GUI, and a media carousel that includes the filtered media content at a second position within the GUI.

According to certain example embodiments, the media content may include AR content, wherein AR is a live direct or indirect view of a physical, real-world environment whose elements are augmented by computer-generated sensory inputs and content. AR content may therefore include a media overlay, or "lens" that comprises a set of media items which may be presented as an overlay, or filter, upon an image displayed at a client device. Accordingly, there may be different categories of AR content, wherein the categories are based on display characteristics or content of the AR content. For example, AR content categories may include AR text to be presented as AR content, as well as lenses that alter or modify one or more objects depicted in an image.

In some embodiments, a lens includes AR content configured to modify or transform image data presented within a GUI of a client device in some way. For example, complex additions or transformations to the content images may be performed using lens data, such as adding rabbit ears to the head of a person in a video clip, adding floating hearts with background coloring to a video clip, altering the proportions of a person's features within a video clip, or many numerous other such transformations. This includes both real-time modifications which modify an image as it is captured using a camera associated with a client device and then displayed on a screen of the client device with the lens modifications, as well as modifications to stored content, such as video clips in a gallery that may be modified using lenses. For example, in a creator profile with multiple lenses, an authorized third party account may use a single video clip with multiple lenses to see how the different lenses will modify the stored clip. Similarly, real-time video capture may be used with a lens to show how video images currently being captured by sensors of a device would modify the captured data. Such data may simply be displayed on the screen and not stored in memory, or the content captured by the device sensors may be recorded and stored in memory with or without the lens modifications (or both).

Lens data and various systems to use lenses and modify content using lenses may thus involve detection of objects (e.g. faces, hands, bodies, cats, dogs, surfaces, objects, etc), tracking of such objects as they leave, enter, and move around the field of view in video frames, and the modification or transformation of such objects as they are tracked. In various embodiments, different methods for achieving such transformations may be used. For example, some embodiments may involve generating a 3D mesh model of the object or objects, and using transformations and animated textures of the model within the video to achieve the transformation. In other embodiments, tracking of points on an object may be used to place an image or texture (which may be two dimensional or three dimensional) at the tracked position. In still further embodiments, neural network analysis of video frames may be used to place images, models, or textures in content (e.g. images or frames of video). Lens data thus refers both to the images, models, and textures used to create transformations in content, as well as to additional modeling and analysis information needed to achieve such transformations with object detection, tracking, and placement.

In some embodiments, an "AR bar" configured to present a plurality of AR media categories, comprises a display of a plurality of media category identifiers. The media category identifiers may include graphical icons. Each media category identifier therefore corresponds with a set of media content attributes. Responsive to receive a selection of a media category identifier from among the plurality of media content identifiers, a collection of media content presented within a media carousel may be filtered. For example, the plurality of media category identifiers may include an AR text category. Responsive to receiving a selection of the AR text category identifier, the dynamic menu system filters the collection of media content presented in the media carousel based on the selection and presents all available AR text content within the media carousel.

In some embodiments, responsive to receiving the input through the GUI at the client device, the dynamic menu system accesses the live camera data from the camera of the client device to extract one or more image features. For example, the dynamic menu system may perform one or more object detection techniques upon the live camera data to identify objects or features depicted within the live camera data. The dynamic menu system may then select a media category from among the plurality of media categories based on the objects or features depicted in the live camera data and filter the collection of media content accordingly.

FIG. 1 is a block diagram showing an example messaging system 100 for exchanging data (e.g., messages and associated content) over a network. The messaging system 100 includes one or more client device 102 which host a number of applications including a messaging client application 104. Each messaging client application 104 is communicatively coupled to other instances of the messaging client application 104 and a messaging server system 108 via a network 106 (e.g., the Internet).

Accordingly, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video or other multimedia data).

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. In some embodiments, this data includes, message content, client device information, geolocation information, media annotation and overlays, message content persistence conditions, social network information, and live event information, as examples. In other embodiments, other data is used. Data exchanges within the messaging system 100 are invoked and controlled through functions available via GUIs of the messaging client application 104.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the Application Program Interface (API) server 110, this server receives and transmits message data (e.g., commands and message payloads) between the client device 102 and the application server 112. Specifically, the Application Program Interface (API) server 110 provides a set of interfaces (e.g., routines and protocols) that can be called or queried by the messaging client application 104 in order to invoke functionality of the application server 112. The Application Program Interface (API) server 110 exposes various functions supported by the application server 112, including account registration, login functionality, the sending of messages, via the application server 112, from a particular messaging client application 104 to another messaging client application 104, the sending of media files (e.g., images or video) from a messaging client application 104 to the messaging server application 114, and for possible access by another messaging client application 104, the setting of a collection of media data (e.g., story), the retrieval of a list of friends of a user of a client device 102, the retrieval of such collections, the retrieval of messages and content, the adding and deletion of friends to a social graph, the location of friends within a social graph, opening and application event (e.g., relating to the messaging client application 104).

The application server 112 hosts a number of applications and subsystems, including a messaging server application 114, an image processing system 116, a social network system 122, and a dynamic menu system 124. The dynamic menu system 124 is configured to generate a dynamic media menu that comprises at least a media carousel to present collections of media content, and an "Augmented-Reality (AR) bar" to receive inputs to identify a media category. Further details of the dynamic menu system 124 can be found in FIG. 3 below.

The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor and memory intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114.

The social network system 122 supports various social networking functions services, and makes these functions and services available to the messaging server application 114. To this end, the social network system 122 maintains and accesses an entity graph 304 within the database 120. Examples of functions and services supported by the social network system 122 include the identification of other users of the messaging system 100 with which a particular user has relationships or is "following," and also the identification of other entities and interests of a particular user.

The application server 112 is communicatively coupled to a database server 118, which facilitates access to a database 120 in which is stored data associated with messages processed by the messaging server application 114.

Figure 2:
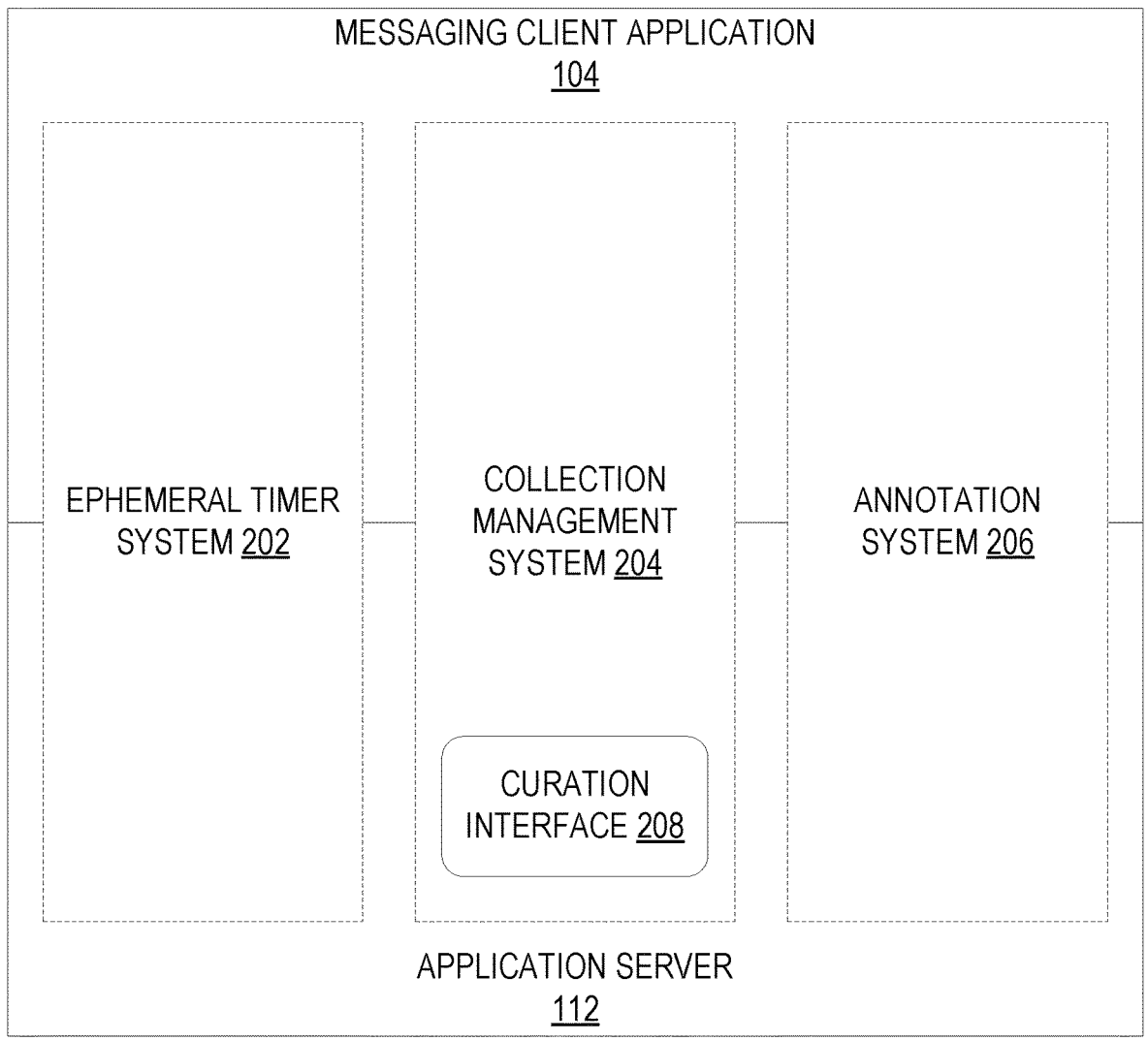
FIG. 2 is block diagram illustrating further details regarding a messaging system, according to example embodiments.

FIG. 2 is block diagram illustrating further details regarding the messaging system 100, according to example embodiments. Specifically, the messaging system 100 is shown to comprise the messaging client application 104 and the application server 112, which in turn embody a number of some subsystems, namely an ephemeral timer system 202, a collection management system 204 and an annotation system 206.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, collection of messages (e.g., a SNAPCHAT story), or graphical element, selectively display and enable access to messages and associated content via the messaging client application 104. Further details regarding the operation of the ephemeral timer system 202 are provided below.

The collection management system 204 is responsible for managing collections of media (e.g., collections of text, image video and audio data). In some examples, a collection of content (e.g., messages, including images, video, text and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay (e.g., a SNAPCHAT filter, lens) to the messaging client application 104 based on a geolocation of the client device 102. In another example, the annotation system 206 operatively supplies a media overlay to the messaging client application 104 based on other information, such as, social network information of the user of the client device 102. A media overlay may include audio and visual content and visual effects. Examples of audio and visual content include pictures, texts, logos, animations, and sound effects, as well as animated facial models, such as those generated by the dynamic menu system 124. An example of a visual effect includes color overlaying. The audio and visual content or the visual effects can be applied to a media content item (e.g., a photo) at the client device 102. For example, the media overlay including text that can be overlaid on top of a photograph generated taken by the client device 102. In another example, the media overlay includes an identification of a location overlay (e.g., Venice beach), a name of a live event, or a name of a merchant overlay (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map, and upload content associated with the selected geolocation. The user may also specify circumstances under which a particular media overlay should be offered to other users. The annotation system 206 generates a media overlay that includes the uploaded content and associates the uploaded content with the selected geolocation.

Figure 3:
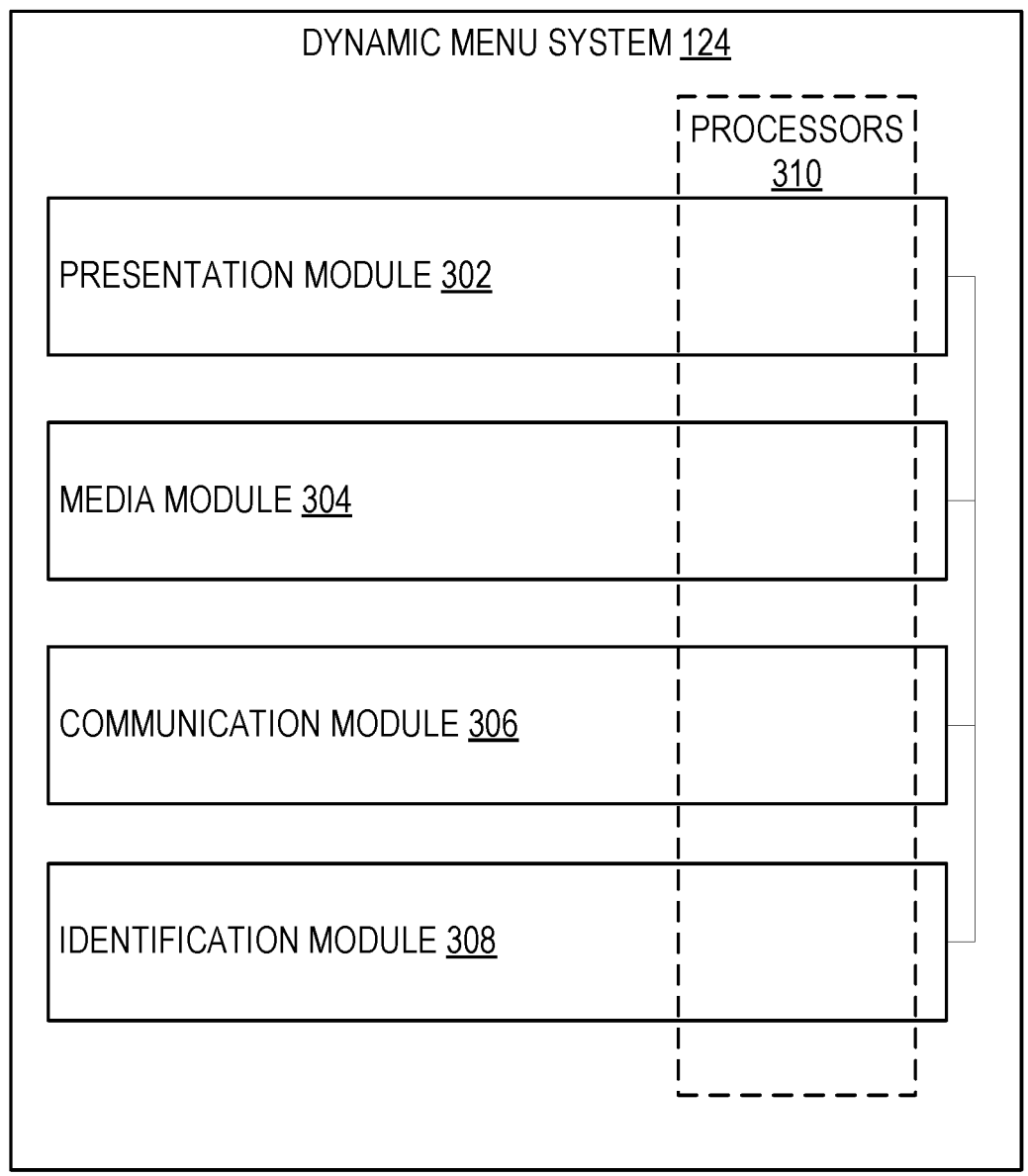
FIG. 3 is a block diagram illustrating various modules of a dynamic menu system, according to certain example embodiments.

In another example embodiment, the annotation system 206 provides a merchant-based publication platform that enables merchants to select a particular media overlay associated with a geolocation via a bidding process. For example, the annotation system 206 associates the media overlay of a highest bidding merchant with a corresponding geolocation for a predefined amount of time FIG. 3 is a block diagram illustrating components of the dynamic menu system 124 that configure the dynamic menu system 124 to perform operations to generate a dynamic media menu that comprises at least a media carousel to present collections of media content, and an AR bar to receive inputs to identify a media category, according to certain example embodiments.

In further embodiments, the components of the dynamic menu system 124 may configure the dynamic menu system 124 to perform operations to access live camera data from a camera associated with the client device 102, receive an input onto a GUI presented at the client device 102, access media content in response to the input, select a media category based on at least the live camera data, filter the media content based on the media category, and cause display of a presentation of the filtered media content within the GUI at the client device, wherein the presentation of the filtered media content includes a display of a media carousel that includes the filtered media content, and an AR bar that includes a display of the plurality of media categories that include the media category that corresponds with the filtered media content, according to some example embodiments.

The dynamic menu system 124 is shown as including a presentation module 302, a media module 304, a communication module 306, and an identification module 308, all configured to communicate with each other (e.g., via a bus, shared memory, or a switch). Any one or more of these modules may be implemented using one or more processors 310 (e.g., by configuring such one or more processors to perform functions described for that module) and hence may include one or more of the processors 310.

Any one or more of the modules described may be implemented using hardware alone (e.g., one or more of the processors 310 of a machine) or a combination of hardware and software. For example, any module described of the dynamic menu system 124 may physically include an arrangement of one or more of the processors 310 (e.g., a subset of or among the one or more processors of the machine) configured to perform the operations described herein for that module. As another example, any module of the dynamic menu system 124 may include software, hardware, or both, that configure an arrangement of one or more processors 310 (e.g., among the one or more processors of the machine) to perform the operations described herein for that module. Accordingly, different modules of the dynamic menu system 124 may include and configure different arrangements of such processors 310 or a single arrangement of such processors 310 at different points in time. Moreover, any two or more modules of the dynamic menu system 124 may be combined into a single module, and the functions described herein for a single module may be subdivided among multiple modules. Furthermore, according to various example embodiments, modules described herein as being implemented within a single machine, database, or device may be distributed across multiple machines, databases, or devices.

FIG. 4 is a flowchart depicting a method 400 of generating and causing display of a dynamic media menu, according to certain example embodiments. Operations of the method 400 may be performed by the modules described above with respect to FIG. 3. As shown in FIG. 4, the method 400 includes one or more operations 402, 404, 406, 408, 410, and 412.

At operation 402, the presentation module 302 causes display of a GUI at the client device 102, where the GUI comprises a display of live camera data generated by a camera of or associated with the client device 102. For example, the client device 102 may include a plurality of cameras such as one or more "front-facing" cameras, and one or more "back-facing" cameras, configured to capture and generate image data. The live camera data generated by the one or more cameras associated with the client device 102 may include image data that comprises a plurality of image features.

At operation 404, the communication module 306 receives an input through the GUI from the client device 102. In some embodiments, the client device 102 includes a touch-screen display configured to receive tactile inputs. The input may therefore include a tactile input onto a display of the client device 102, wherein the tactile input provides an indication of a point or position within the GUI. For example, a user of the client device 102 may provide an input to identify a location or object depicted within the GUI by providing a tactile input that selects a point within the display of the live camera data, wherein the point corresponds with an object depicted by the live camera data and presented within the GUI. For example, as seen in the interface 610 depicted in FIG. 6, an input may include the input 620, wherein the input 620 selects a point within the interface 610 that corresponds with an object depicted by the live camera data—in this case, a mug or cup.

In some embodiments, the input may comprise one or more input properties that include an input pressure, an input duration, and an input location. In such embodiments, the communication module 306 compares one or more of the input properties against a set of threshold values. For example, responsive to detecting an input property transgress a threshold value, the communication module 306 may signal one or more modules of the dynamic menu system 124 to perform certain follow-up actions or operations.

At operation 406, the media module 304 accesses media content in response to the input received at the client device 102. For example, the media module 304 may access a media repository at the database 120, where the media content is indexed and stored based on a plurality of corresponding media categories. In some embodiments, the media categories may include pre-configured media items, as well as customizable media items, one or more categories corresponding with text-based media items, one or more categories corresponding to AR media content, such as media overlays or media filters, and one or more categories corresponding to auditory media, such as music or sound-effects.

In some embodiments, the media module 304 may access the media content at the database 120 responsive to detecting an input property of the input received at the client device 102 transgressing a threshold value. For example, the media module 304 may be configured to access the media content at the database 120 responsive to detecting an input pressure exceed a threshold pressure value, or an input duration exceed a threshold input duration value.

At operation 408, the media module 304 selects a media category from among the plurality of media categories based on one or more contextual inputs that include at least the plurality of image features of the live camera data from the camera associated with the client device 102. Contextual inputs may include temporal data and location data, as well as device information and user profile information. In further embodiments, the selection of the media category may be based on whether the live camera data is streamed from a front-facing camera or a back-facing camera, as well as whether or not a user of the client device 102 is generating a live-stream presented to one or more client devices, or is generating media content to be distributed at a later time.

In some embodiments, responsive to detecting an input property transgressing a threshold value, as discussed above, the media module 304 may cause the identification module 308 to scan the live camera data to identify one or more objects depicted in the live camera data, based on the plurality of image features of the live camera data. For example, to identify the one or more objects depicted in the live camera data, the identification module 308 may utilize computer vision to perform one or more image or pattern recognition techniques based on the plurality of image features. In further embodiments, the identification module 308 may identify one or more QR codes within the image and identify the one or more objects based on the QR codes. In some embodiments, the identification may be based on an explicit input provided by a user of the client device 102. Based on the one or more objects identified in the image by the identification module 308, the media module 304 selects a media category that corresponds with the one or more objects.

At operation 410, responsive to selecting a media category, the media. module 304 filters the media content accessed at the database 120 to identify a plurality of media items corresponding to the selected media category, and curates a collection of media content based on the selected media category. In some embodiments, the media module 304 may sort or rank the filtered media content based on the one or more contextual inputs and the live camera data from the client device 102.

Figure 5:
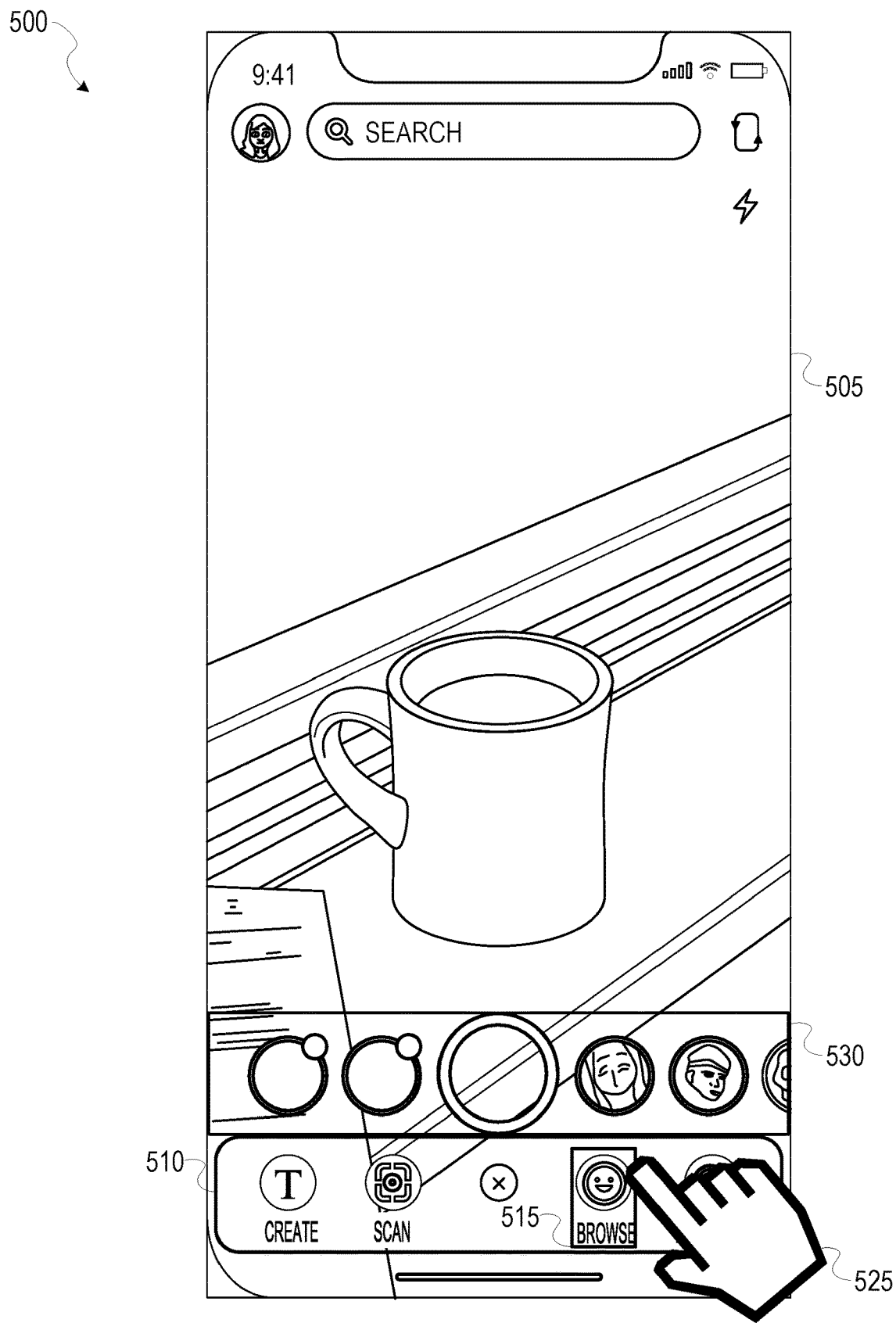
FIG. 5 is an interface diagram depicting a GUI generated and displayed by a dynamic menu system, according to certain example embodiments.

At operation 412, the presentation module 302 causes display of a presentation of the collection of media content at the client device 102 in a media carousel and displays an AR bar that comprises a display of the plurality of media categories, as seen in the AR bar 510 depicted in the interface diagram 500 of FIG. 5. Accordingly, a user may provide an input to select a media category from among the display of the plurality of media categories presented in the AR bar 505, and in response, the dynamic menu system 124 may filter and present the media content within the media carousel 530.

FIG. 5 is an interface diagram 500 depicting a GUI 505 generated and displayed by the dynamic menu system 124, as discussed in the method 400 above, according to certain example embodiment. As seen in FIG. 5, the GUI 505 includes a presentation of a collection of media content within a media carousel 530, and an AR bar 510 that includes a display of a plurality of media categories. As discussed above, the media categories may include pre-configured media items, as well as customizable media items (based on user input), one or more categories corresponding with text-based media items, one or more categories corresponding to AR media content, such as media overlays or media filters, and one or more categories corresponding to auditory media, such as music or sound-effects.

In some example embodiments, a media category may be selected based on contextual inputs and live camera data, as well as based on a user input, such as the user input 525. Responsive to selecting or receiving a selection of a media category, the dynamic menu system 124 applies a graphical icon that corresponds with the selected media category, such as the graphical icon 515, to identify the selected media category.

FIG. 6 is an interface flow-diagram 600 depicting interfaces presented by the dynamic menu system 124, according to certain example embodiments. Operations depicted by the interfaces of the flow-diagram 600 may be performed by the modules described above with respect to FIG. 3.

Interface 605 depicts live camera data captured by a camera associated with the client device 102. As seen in FIG. 6, the live camera data may include a plurality of image features that depict one or more objects (e.g., a coffee mug).

Interface 610 depicts an input 620 onto a position within the interface presented at the client device 102. As discussed above, the input may comprise one or more input properties such as an input pressure, an input location (i.e., a point within the GUI), and an input duration.

In some embodiments, a graphic 625 may be presented within the interface responsive to receiving the input 620. The graphic 625 may change or vary based on the input properties of the input 620, in real-time. For example, responsive to receiving an initiation of the input 620, the graphic 625 may be presented in a first graphical state. As an input property of the input 620 transgresses one or more threshold values, for example by exceeding a temporal threshold, or exceeding a pressure threshold, the dynamic menu system 124 may change the graphic 625 to a second graphical state that corresponds with the threshold exceeded by the input 620.

As an illustrative example, a user may initiate the input 620 by pressing a finger or stylus onto the GUI depicted in interface 605. Responsive to detecting the initiation of the input 620, the presentation module 302 causes display of the graphic 625 in a first graphical state, where the first graphical state comprises a first set of graphical properties (e.g., colors, animations). As the user continues pressing onto the GUI, the communication module 306 may detect that an input duration of the input 620 transgresses a first threshold value (e.g., 5 seconds). In response, to the input duration exceeding the first threshold value, the presentation module 302 displays the graphic 625 in a second graphical state that corresponds with the first threshold value, where the second graphical state comprises a second set of graphical properties. The user may then press with a greater amount of pressure, and in responsive, the communication module 306 may detect an input pressure of the input 620 transgressing a second threshold value (e.g., a pressure value). In response, the presentation module 302 displays the graphic 625 in a third graphical state that corresponds with the second threshold value, where the third graphical state comprises a third set of graphical properties.

In some embodiments, the threshold values may each be associated with a corresponding media category, such that responsive to detecting an input property transgressing a threshold value, the dynamic menu system 124 may select the media category corresponding to the threshold value.

Interface 615 depicts a presentation of a collection of media content 630 in a media carousel, such as the media carousel 530 of FIG. 5, and a display of an AR bar, such as the AR bar 510 of FIG. 5, that includes a media category identifier 640.

In some embodiments, responsive to filtering a collection of media. content based on a selected media category, the presentation module 302 may determine an attribute of the filtered collection of media content (e.g., a number of media items in the collection), and cause display of the indication 635, wherein the indicator 635 includes a presentation of the attribute of the filtered collection of media content.

FIG. 7 is an interface flow-diagram 700 depicting interfaces presented by a dynamic menu system 124, according to certain example embodiments. Operations depicted by the interfaces of the flow-diagram 700 may be performed by the modules described above with respect to FIG. 3.

Interface 705 depicts live camera data captured by a camera associated with the client device 102 and presented within a GUI at the client device 102. As seen in FIG. 7, the live camera data may include a plurality of image features that may correspond with an AR media category. For example, as illustrated in interface 705, the live camera data may depict text presented upon a surface, such as a whiteboard or chalkboard.

A user of the client device 102 may provide an input 720 to the dynamic menu system 124 through the GUI depicted in interface 705. In some embodiments, responsive to the input 720, the dynamic menu system 124 may activate a scan feature to perform one or more object recognition techniques upon the live camera data presented within the interface 705.

For example, as discussed in operation 610 of the interface flow-diagram 600 depicted in FIG. 6, in response to detecting an input property of the input 720 transgressing one or more threshold values that may include a temporal threshold or a pressure threshold, a scan feature of the dynamic menu system 124 may be activated. In certain embodiments, the scan feature may include object detection techniques to identify semantic objects of a certain class in the live camera data presented within the GUI.

Interface 710 depicts a collection of AR media, such as AR media 725, that corresponds with the one or more image features of the live camera data, presented in the media carousel 730. Responsive to the input, the AR bar 735 may present a selection of a graphical icon 740 that corresponds with the scan feature. For example, as seen in FIG. 7, responsive to activating the scan feature of the dynamic menu system 124, the graphical icon 740 is underlined or otherwise emphasized in the GUI.

Interface 715 comprises a display of AR content 745 presented at a position in the live camera data.

Software Architecture

Figure 8:
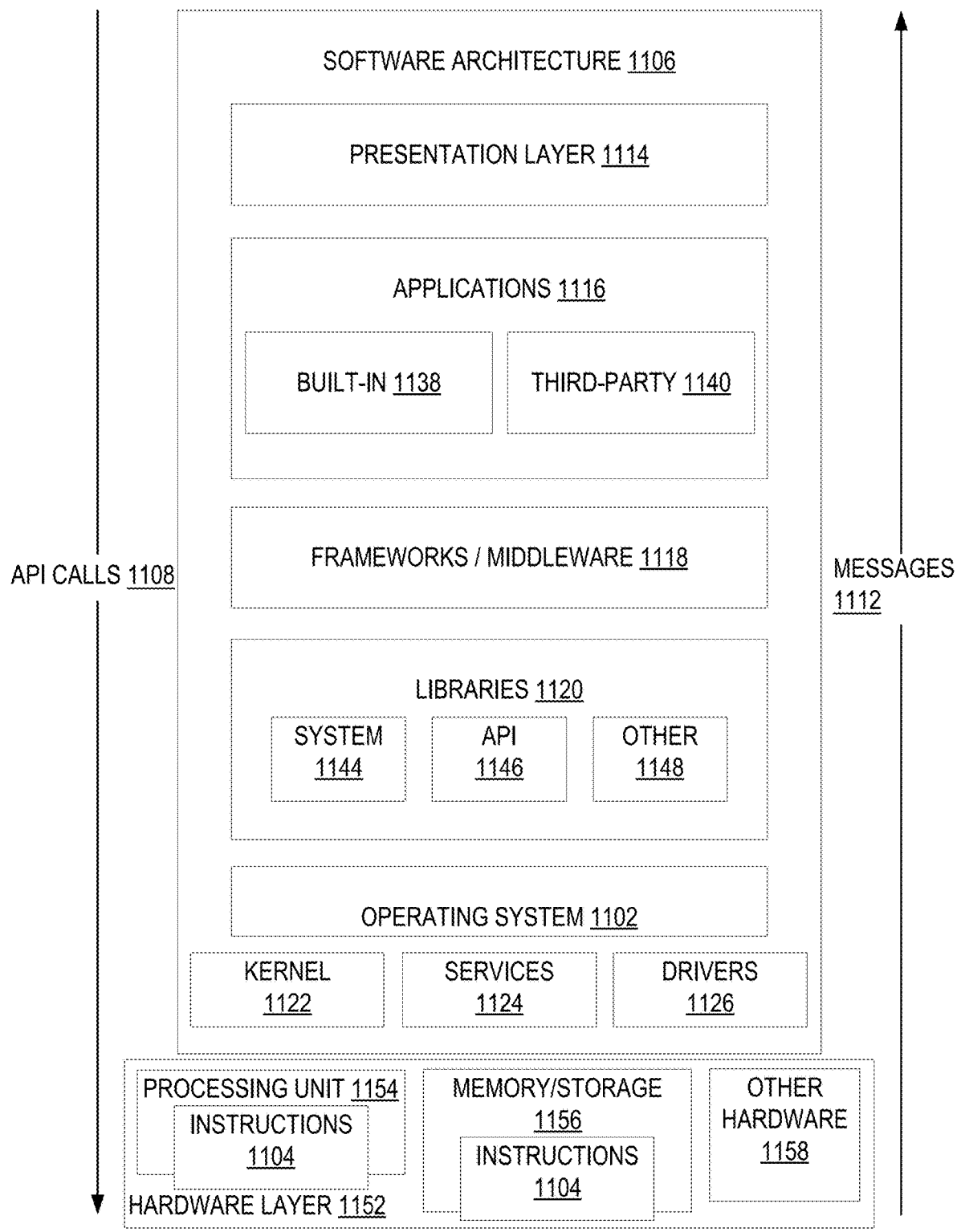
FIG. 8 is a block diagram illustrating a representative software architecture, which may be used in conjunction with various hardware architectures herein described and used to implement various embodiments.
Figure 9:
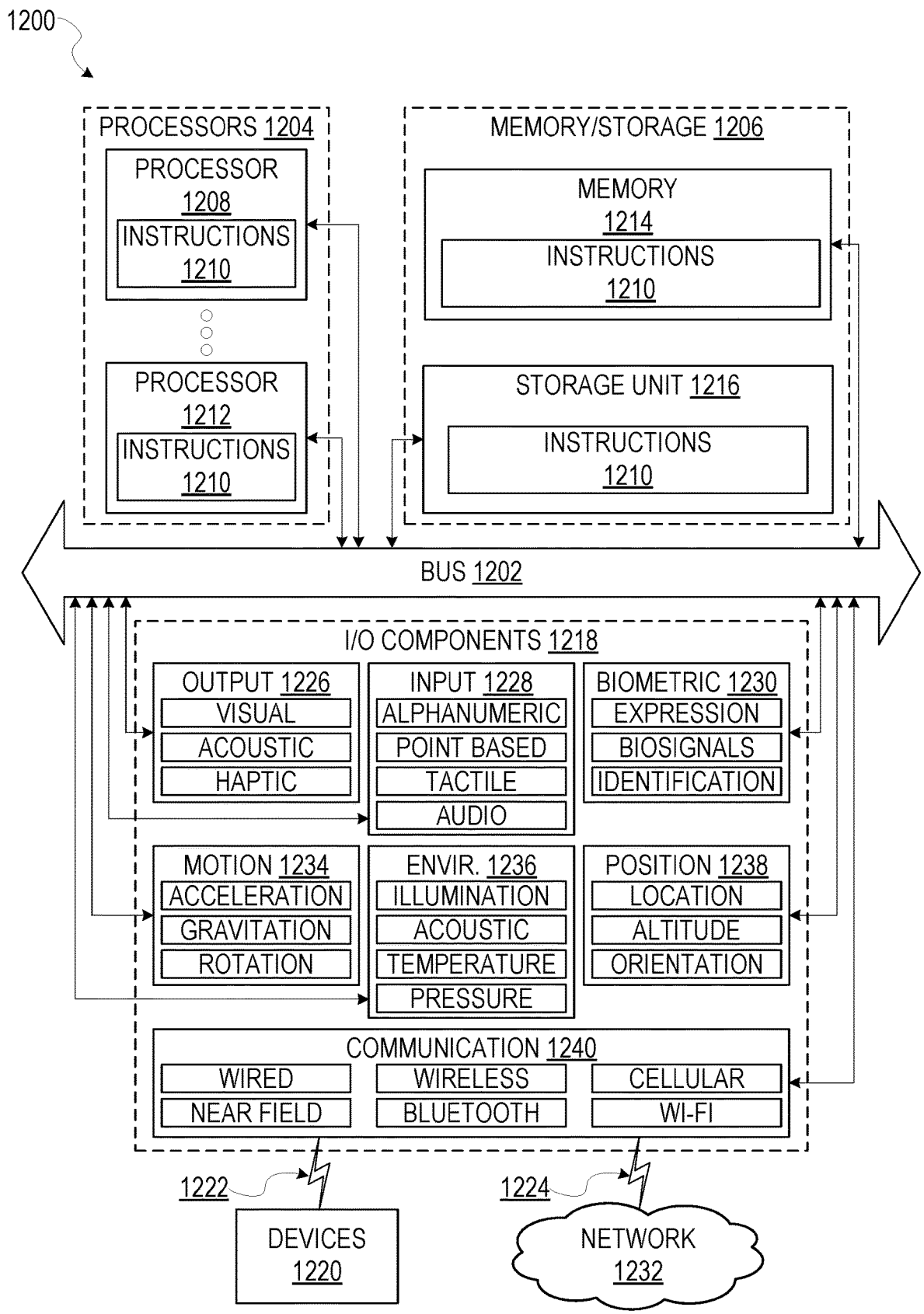
FIG. 9 is a block diagram illustrating components of a machine, according to some example embodiments, able to read instructions from a machine-readable medium (e.g., a machine-readable storage medium) and perform any one or more of the methodologies discussed herein.

FIG. 8 is a block diagram illustrating an example software architecture 806, which may be used in conjunction with various hardware architectures herein described. FIG. 8 is a non-limiting example of a software architecture and it will be appreciated that many other architectures may be implemented to facilitate the functionality described herein. The software architecture 806 may execute on hardware such as machine 900 of FIG. 9 that includes, among other things, processors 904, memory 914, and I/O components 918. A representative hardware layer 852 is illustrated and can represent, for example, the machine 800 of FIG. 8. The representative hardware layer 852 includes a processing unit 854 having associated executable instructions 804. Executable instructions 804 represent the executable instructions of the software architecture 806, including implementation of the methods, components and so forth described herein. The hardware layer 852 also includes memory and/or storage modules memory/storage 856, which also have executable instructions 804. The hardware layer 852 may also comprise other hardware 858.

In the example architecture of FIG. 8, the software architecture 806 may be conceptualized as a stack of layers where each layer provides particular functionality. For example, the software architecture 806 may include layers such as an operating system 802, libraries 820, applications 816 and a presentation layer 814. Operationally, the applications 816 and/or other components within the layers may invoke application programming interface (API) API calls 808 through the software stack and receive a response as in response to the API calls 808. The layers illustrated are representative in nature and not all software architectures have all layers. For example, some mobile or special purpose operating systems may not provide a frameworks/middleware 818, while others may provide such a layer. Other software architectures may include additional or different layers.

The operating system 802 may manage hardware resources and provide common services. The operating system 802 may include, for example, a kernel 822, services 824 and drivers 826. The kernel 822 may act as an abstraction layer between the hardware and the other software layers. For example, the kernel 822 may be responsible for memory management, processor management (e.g., scheduling), component management, networking, security settings, and so on. The services 824 may provide other common services for the other software layers. The drivers 826 are responsible for controlling or interfacing with the underlying hardware. For instance, the drivers 826 include display drivers, camera drivers. Bluetooth® drivers, flash memory drivers, serial communication drivers (e.g., Universal Serial Bus (USB) drivers). Wi-Fi® drivers, audio drivers, power management drivers, and so forth depending on the hardware configuration.

The libraries 820 provide a common infrastructure that is used by the applications 816 and/or other components and/or layers. The libraries 820 provide functionality that allows other software components to perform tasks in an easier fashion than to interface directly with the underlying operating system 802 functionality (e.g., kernel 822, services 824 and/or drivers 826). The libraries 820 may include system libraries 844 (e.g., C standard library) that may provide functions such as memory allocation functions, string manipulation functions, mathematical functions, and the like. In addition, the libraries 820 may include API libraries 846 such as media libraries (e.g., libraries to support presentation and manipulation of various media format such as MPREG4, H.264, MP3, AAC, AMR, PG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 820 may also include a wide variety of other libraries 848 to provide many other APIs to the applications 816 and other software components/modules.

The frameworks/middleware 818 (also sometimes referred to as middleware) provide a higher-level common infrastructure that may be used by the applications 816 and/or other software components/modules. For example, the frameworks/middleware 818 may provide various graphic user interface (GUI) functions, high-level resource management, high-level location services, and so forth. The frameworks/middleware 818 may provide a broad spectrum of other APIs that may be utilized by the applications 816 and/or other software components/modules, some of which may be specific to a particular operating system 802 or platform.

The applications 816 include built-in applications 838 and/or third-party applications 840. Examples of representative built-in applications 838 may include, but are not limited to, a contacts application, a browser application, a book reader application, a location application, a media application, a messaging application, and/or a game application. Third-party applications 840 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 840 may invoke the API calls 808 provided by the mobile operating system (such as operating system 802) to facilitate functionality described herein.

The applications 816 may use built in operating system functions (e.g., kernel 822, services 824 and/or drivers 826), libraries 820, and frameworks/middleware 818 to create user interfaces to interact with users of the system. Alternatively, or additionally, in some systems interactions with a user may occur through a presentation layer, such as presentation layer 814. In these systems, the application/component "logic" can be separated from the aspects of the application/component that interact with a user.

FIG. 12 is a block diagram illustrating components of a machine 1200, according to some example embodiments, able to read instructions from a machine-readable medium (e.g., a machine-readable storage medium) and perform any one or more of the methodologies discussed herein. Specifically, FIG. 12 shows a diagrammatic representation of the machine 1200 in the example form of a computer system, within which instructions 1210 (e.g., software, a program, an application, an applet, an app, or other executable code) for causing the machine 1200 to perform any one or more of the methodologies discussed herein may be executed. As such, the instructions 1210 may be used to implement modules or components described herein. The instructions 1210 transform the general, non-programmed machine 1200 into a particular machine 1200 programmed to carry out the described and illustrated functions in the manner described. In alternative embodiments, the machine 1200 operates as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1210, sequentially or otherwise, that specify actions to be taken by machine 1200. Further, while only a single machine 1200 is illustrated, the term "machine" shall also be taken to include a collection of machines that individually or jointly execute the instructions 1210 to perform any one or more of the methodologies discussed herein.

The machine 1200 may include processors 1204, memory memory/storage 1206, and I/O components 1218, which may be configured to communicate with each other such as via a bus 1202. The memory/storage 1206 may include a memory 1214, such as a main memory, or other memory storage, and a storage unit 1216, both accessible to the processors 1204 such as via the bus 1202. The storage unit 1216 and memory 1214 store the instructions 1210 embodying any one or more of the methodologies or functions described herein. The instructions 1210 may also reside, completely or partially, within the memory 1214, within the storage unit 1216, within at least one of the processors 1204 (e.g., within the processor's cache memory), or any suitable combination thereof, during execution thereof by the machine 1200. Accordingly, the memory 1214, the storage unit 1216, and the memory of processors 1204 are examples of machine-readable media.

The I/O components 1218 may include a wide variety of components to receive input, provide output, produce output, transmit information, exchange information, capture measurements, and so on. The specific I/O components 1218 that are included in a particular machine 1200 will depend on the type of machine. For example, portable machines such as mobile phones will likely include a touch input device or other such input mechanisms, while a headless server machine will likely not include such a touch input device. It will be appreciated that the I/O components 1218 may include many other components that are not shown in FIG. 12. The I/O components 1218 are grouped according to functionality merely for simplifying the following discussion and the grouping is in no way limiting. In various example embodiments, the I/O components 1218 may include output components 1226 and input components 1228. The output components 1226 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1228 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1218 may include biometric components 1230, motion components 1234, environmental environment components 1236, or position components 1238 among a wide array of other components. For example, the biometric components 1230 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1234 may include acceleration sensor components (e.g., accelerometer), gravitation sensor components, rotation sensor components (e.g., gyroscope), and so forth. The environment components 1236 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1238 may include location sensor components (e.g., a Global Position system (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1218 may include communication components 1240 operable to couple the machine 1200 to a network 1232 or devices 1220 via coupling 1222 and coupling 1224 respectively. For example, the communication components 1240 may include a network interface component or other suitable device to interface with the network 1232. In further examples, communication components 1240 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1220 may be another machine or any of a wide variety of peripheral devices (e.g., a peripheral device coupled via a Universal Serial Bus (USB)).

Moreover, the communication components 1240 may detect identifiers or include components operable to detect identifiers. For example, the communication components 1240 may include Radio Frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1240, such as, location via Internet Protocol (IP) geo-location, location via Wi-Fi® signal triangulation, location via detecting a NFC beacon signal that may indicate a particular location, and so forth.

GLOSSARY

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT) Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LIE) standard, others defined by various standard setting organizations, other long range protocols, or other data transfer technology.

"EMPHEMERAL MESSAGE" in this context refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component"(or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

"LIFT" in this context is a measure of the performance of a targeted model at predicting or classifying cases as having an enhanced response (with respect to a population as a whole), measured against a random choice targeting model.

"PHONEME ALIGNMENT" in this context, a phoneme is a unit of speech that differentiates one word from another. One phoneme may consist of a sequence of closure, burst, and aspiration events; or, a dipthong may transition from a back vowel to a front vowel. A speech signal may therefore be described not only by what phonemes it contains, but also the locations of the phonemes. Phoneme alignment may therefore be described as a "time-alignment" of phonemes in a waveform, in order to determine an appropriate sequence and location of each phoneme in a speech signal.

"AUDIO-TO-VISUAL CONVERSION" in this context refers to the conversion of audible speech signals into visible speech, wherein the visible speech may include a mouth shape representative of the audible speech signal.

"TIME DELAYED NEURAL NETWORK (TDNN)" in this context, a TDNN is an artificial neural network architecture whose primary purpose is to work on sequential data. An example would be converting continuous audio into a stream of classified phoneme labels for speech recognition.

"BI-DIRECTIONAL LONG-SHORT TERM MEMORY (BLSTM)" in this context refers to a recurrent neural network (RNN) architecture that remembers values over arbitrary intervals. Stored values are not modified as learning proceeds. RNNs allow forward and backward connections between neurons. BLSTM are well-suited for the classification, processing, and prediction of time series, given time lags of unknown size and duration between events.

What is claimed is:

1. A method comprising:
   causing display of a graphical user interface (GUI) at a client device, the GUI comprising a display of camera data that includes live camera data from a camera of the client device, the live camera data comprising a set of image features that depict an object at a position within the display of the live camera data;
   receiving a tactile input that selects the set of image features that depict the object at the position within the display of the live camera data from the client device, the tactile input comprising an input duration;
   determining that the input duration of the tactile input transgresses a threshold value;
   detecting the object depicted within the display of the live camera data based on the set of image features responsive to the determining that the input duration transgresses the threshold value;
   identifying a first media category from among a plurality of media categories based on the object depicted within the display of the live camera data and the camera data that include live camera data, the first media category comprising media content that corresponds with the object;
   presenting a notification responsive to identifying the first media category based on the object, the notification including a display of a numerical value that indicates a quantity of available augmented reality (AR) media content items associated with the first media category, wherein the AR media content items comprise models and textures configured to transform visual characteristics of the detected object within the display of the live camera data and the numerical value represents the AR media content items that are compatible with the transforming of the detected object within the display of the live camera data; and
   causing display of a presentation of the media content of the first media category within the GUI at the client device, the presentation of the media content comprising an identification of the first media category at a first position in the GUI, and a media carousel that includes the media content at a second position in the GUI.

2. The method of claim 1, wherein the plurality of media categories each correspond with a media category identifier, the first media category corresponding with a first media category identifier, and the identification of the first media category includes:
   causing display of a set of media category identifiers that include the first media category identifier at the first position in the GUI; and
   applying a graphical icon to the first media category identifier that corresponds with the first media category in the GUI based on the selecting the first media category based on the live camera data.

3. The method of claim 1, wherein the plurality of media categories include the first media category and a second media category, and the method further comprises:
   receiving a selection of the second media category;
   filtering the media content based on the selection of the second media category; and
   updating the presentation of the filtered media content based on the second media category.

4. The method of claim 3, wherein the method further comprises:
   sorting the filtered media content based on at least the live camera data.

5. The method of claim 1, wherein the selecting the first media category based on at least the live camera data includes:
   detecting a plurality of image features that correspond with the first media category within the live camera data.

6. A system comprising:
   a memory; and
   at least one hardware processor coupled to the memory and comprising instructions that causes the system to perform operations comprising:
      causing display of a graphical user interface (GUI) at a client device, the GUI comprising a display of camera data that includes live camera data from a camera of the client device, the live camera data comprising a set of image features that depict an object at a position within the display of the live camera data;
      receiving a tactile input that selects the set of image features that depict the object at the position within the display of the live camera data from the client device, the tactile input comprising an input duration;
      determining that the input duration of the tactile input transgresses a threshold value;
      detecting the object depicted within the display of the live camera data based on the set of image features responsive to the determining that the input duration transgresses the threshold value;
      identifying a first media category from among a plurality of media categories based on the object depicted within the display of the live camera data and the camera data that include live camera data, the first media category comprising media content that corresponds with the object;
      presenting a notification responsive to identifying the first media category based on the object, the notification including a display of a numerical value that indicates a quantity of available augmented reality (AR) media content items associated with the first media category, wherein the AR media content items comprise models and textures configured to transform visual characteristics of the detected object within the display of the live camera data and the numerical value represents the AR media content items that are compatible with the transforming of the detected object within the display of the live camera data; and causing display of a presentation of the media content of the first media category within the GUI at the client device, the presentation of the media content comprising an identification of the first media category at a first position in the GUI, and a media carousel that includes the media content at a second position in the GUI.

7. The system of claim 6, wherein the plurality of media categories each correspond with a media category identifier, the first media category corresponding with a first media category identifier, and the identification of the first media category includes:

causing display of a set of media category identifiers that include the first media category identifier at the first position in the GUI; and applying a graphical icon to the first media category identifier that corresponds with the first media category in the GUI based on the selecting the first media category based on the live camera data.

8. The system of claim 6, wherein the plurality of media categories include the first media category and a second media category, and the instructions further comprise:

receiving a selection of the second media category;

filtering the media content based on the selection of the second media category; and updating the presentation of the filtered media content based on the second media category.

9. The system of claim 8, wherein the instructions further comprise:

sorting the filtered media content based on at least the live camera data.

10. The system of claim 6, wherein the selecting the first media category based on at least the live camera data includes:

detecting a plurality of image features that correspond with the first media category within the live camera data.

11. A non-transitory machine-readable storage medium comprising instructions that, when executed by one or more processors of a machine, cause the machine to perform operations comprising:

causing display of a graphical user interface (GUI) at a client device, the GUI comprising a display of camera data that includes live camera data from a camera of the client device, the live camera data comprising a set of image features that depict an object at a position within the display of the live camera data;

receiving a tactile input that selects the set of image features that depict the object at the position within the display of the live camera data from the client device, the tactile input comprising an input duration;

determining that the input duration of the tactile input transgresses a threshold value;

detecting the object depicted within the display of the live camera data based on the set of image features responsive to the determining that the input duration transgresses the threshold value;

identifying a first media category from among a plurality of media categories based on the object depicted within the display of the live camera data and the camera data that include live camera data, the first media category comprising media content that corresponds with the object;

presenting a notification responsive to identifying the first media category based on the object, the notification including a display of a numerical value that indicates a quantity of available augmented reality (AR) media content items associated with the first media category, wherein the AR media content items comprise models and textures configured to transform visual characteristics of the detected object within the display of the live camera data and the numerical value represents the AR media content items that are compatible with the transforming of the detected object within the display of the live camera data; and causing display of a presentation of the media content of the first media category within the GUI at the client device, the presentation of the media content comprising an identification of the first media category at a first position in the GUI, and a media carousel that includes the media content at a second position in the GUI.

12. The non-transitory machine-readable storage medium of claim 11, wherein the plurality of media categories each correspond with a media category identifier, the first media category corresponding with a first media category identifier, and the identification of the first media category includes:

causing display of a set of media category identifiers that include the first media category identifier at the first position in the GUI; and applying a graphical icon to the first media category identifier that corresponds with the first media category in the GUI based on the selecting the first media category based on the live camera data.

* * * * *